United States Patent
Yuki et al.

(10) Patent No.: US 10,461,879 B2
(45) Date of Patent: Oct. 29, 2019

(54) DEVICE AND METHOD FOR TRANSMITTING WAVELENGTH DIVISION MULTIPLEXED OPTICAL SIGNAL

(71) Applicant: FUJITSU LIMITED, Kawasaki-shi, Kanagawa (JP)

(72) Inventors: Masahiro Yuki, Kawasaki (JP); Atsushi Kiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/852,853

(22) Filed: Dec. 22, 2017

(65) Prior Publication Data

US 2018/0205485 A1 Jul. 19, 2018

(30) Foreign Application Priority Data

Jan. 16, 2017 (JP) .................................. 2017-005314

(51) Int. Cl.
*H04J 14/02* (2006.01)
*H04B 10/80* (2013.01)
(Continued)

(52) U.S. Cl.
CPC ...... *H04J 14/0212* (2013.01); *H04B 10/2942* (2013.01); *H04B 10/807* (2013.01);
(Continued)

(58) Field of Classification Search
CPC ............. H04B 10/807; H04B 10/08; H04B 10/07955; H04B 10/80; H04B 10/2942; H04J 14/0221; H04J 14/02; H04J 14/0201; H04J 14/0206; H04J 14/0212; H04Q 11/0005; H04Q 2011/0016; H04Q 11/00
(Continued)

(56) References Cited

U.S. PATENT DOCUMENTS 6,856,454 B2 * 2/2005 Pavel .................. H01S 3/06758
359/337
6,944,401 B2 * 9/2005 Olier ................. H04B 10/07955
398/25
(Continued)

FOREIGN PATENT DOCUMENTS

JP 2006-033412 2/2006
JP 2010-123698 6/2010

*Primary Examiner* — Abbas H Alagheband
(74) *Attorney, Agent, or Firm* — Fujitsu Patent Center

(57) ABSTRACT

An optical transmission device includes: a first optical amplifier, a WSS (wavelength selective switch), a second optical amplifier and a controller. The first optical amplifier amplifies a received WDM (wavelength division multiplexed) optical signal. The WSS controls optical powers of respective channels multiplexed in the WDM optical signal that is amplified by the first optical amplifier. The second optical amplifier amplifies the WDM optical signal output from the WSS. The controller controls a gain of the first optical amplifier based on initial setting information. The controller corrects the gain of the first optical amplifier such that an average optical power of a plurality of channels multiplexed in the WDM optical signal that is amplified by the first optical amplifier approaches a target level after a specified period of time has elapsed from when the gain of the first optical amplifier is controlled based on the initial setting information.

8 Claims, 18 Drawing Sheets

(51) Int. Cl.
*H04Q 11/00* (2006.01)
*H04B 10/294* (2013.01)

(52) U.S. Cl.
CPC ...... *H04J 14/0221* (2013.01); *H04Q 11/0005* (2013.01); *H04Q 2011/0016* (2013.01)

(58) Field of Classification Search
USPC .......................................................... 398/48
See application file for complete search history.

(56) References Cited

U.S. PATENT DOCUMENTS

| | | | | |
|---|---|---|---|---|
| 7,715,092 B2* | 5/2010 | Bolshtyansky | ..... | H04J 14/0221 359/334 |
| 7,715,093 B2* | 5/2010 | Nishihara | ........... | H01S 3/06754 359/337.1 |
| 7,873,274 B2* | 1/2011 | Collings | .......... | H04B 10/07955 398/18 |
| 8,160,446 B2* | 4/2012 | Collings | .......... | H04B 10/07955 398/79 |
| 8,615,167 B2* | 12/2013 | Sugaya | .............. | H04B 10/2935 398/26 |
| 9,225,459 B2* | 12/2015 | Oda | ..................... | H04J 14/0221 |
| 9,520,694 B2* | 12/2016 | Kachita | ............... | H01S 3/06758 |
| 2006/0013583 A1* | 1/2006 | Fukushi | ................. | H04B 10/03 398/18 |
| 2008/0074731 A1* | 3/2008 | Takeyama | ........... | H01S 3/06758 359/333 |
| 2010/0123949 A1* | 5/2010 | Naito | ................. | H04B 10/2935 359/337.11 |
| 2011/0176802 A1* | 7/2011 | Callan | ................. | H04B 10/296 398/38 |
| 2014/0328583 A1* | 11/2014 | Al Sayeed | ......... | H04J 14/0289 398/7 |
| 2015/0280391 A1* | 10/2015 | Kachita | ............... | H01S 3/06758 359/337.11 |
| 2016/0094307 A1* | 3/2016 | Nakamura | .......... | H04J 14/0221 398/26 |

\* cited by examiner

DEVICE AND METHOD FOR TRANSMITTING WAVELENGTH DIVISION MULTIPLEXED OPTICAL SIGNAL

CROSS-REFERENCE TO RELATED APPLICATION

This application is based upon and claims the benefit of priority of the prior Japanese Patent Application No. 2017-005314, filed on Jan. 16, 2017, the entire contents of which are incorporated herein by reference.

FIELD

The embodiments discussed herein are related to a device and a method for transmitting a wavelength division multiplexed optical signal.

BACKGROUND

Wavelength Division Multiplexing (WDM) has been put into practical use as one technique for achieving large-capacity optical communications. In a WDM transmission system, a WDM optical signal in which a plurality of wavelength channels are multiplexed is transmitted via an optical fiber link. That is, a plurality of optical signals of different wavelengths are multiplexed and transmitted in the WDM transmission system.

A reconfigurable optical add/drop multiplexer (ROADM) is provided in each node in the WDM transmission system. The ROADM may drop an optical signal of a desired wavelength channel from a WDM optical signal. The ROADM may add an optical signal to an empty channel of a WDM optical signal.

FIG. 1 illustrates an example of a WDM transmission system. In the example illustrated in FIG. 1, an optical transmission device provided in each node is a reconfigurable optical add/drop multiplexer. The nodes are connected by optical fiber links.

A reconfigurable optical add/drop multiplexer (ROADM) 100 includes a pre-amplifier (pre-AMP) 110, a wavelength selective switch (WSS) 120, and a post-amplifier (post-AMP) 130. The pre-amplifier 110 amplifies a received WDM optical signal. The wavelength selective switch 120 drops an optical signal of a specified wavelength from the WDM optical signal amplified by the pre-amplifier 110. Further, the wavelength selective switch 120 may add an optical signal to an empty channel of the WDM optical signal. The wavelength selective switch 120 may adjust an optical power of each wavelength channel to a target level. The post-amplifier 130 amplifies the WDM optical signal output from the wavelength selective switch 120. Then, the reconfigurable optical add/drop multiplexer 100 transmits the WDM optical signal amplified by the post-amplifier 130 to an adjacent node.

The reconfigurable optical add/drop multiplexer 100 includes functions that respectively control gains of the pre-amplifier 110 and the post-amplifier 130. FIG. 1 illustrates the function that controls a gain of the pre-amplifier 110. An optical power monitor (PD) 111 detects an output optical power of the pre-amplifier 110. An amplifier controller 112 controls the gain of the pre-amplifier 110 such that the output optical power of the pre-amplifier 110 approaches a target level. This function maintains the output optical power of the pre-amplifier 110 at the target level.

An optical amplifier that can compensate for a sudden change in a power level of received light has been proposed (for example, Japanese Laid-open Patent Publication No. 2010-123698). Further, a method for setting a gain of an optical amplifier provided in a relay station of an optical transmission system has been proposed (for example, Japanese Laid-open Patent Publication No. 2006-33412).

As described above, the reconfigurable optical add/drop multiplexer 100 includes a function that controls an optical power of a WDM optical signal at a target level. However, when each reconfigurable optical add/drop multiplexer 100 controls the gain of the pre-amplifier 110 (or the post-amplifier 130) individually, the optical power of the WDM optical signal may be controlled improperly.

FIG. 2 illustrates an example in which an optical power of a WDM optical signal is controlled improperly. In the example illustrated in FIG. 2, a WDM optical signal is transmitted from a ROADM #1 to a ROADM #2. It is assumed that, before a time T1, an output optical power of the pre-amplifier 110 in the ROADM #1 is lower than a target level by 2 dB, and an output optical power of the pre-amplifier 110 in the ROADM #2 is lower than a target level by 3 dB.

In this case, a gain control is performed in the ROADM #1 such that the output optical power of the pre-amplifier 110 becomes higher by 2 dB. In the ROADM #2, a gain control is performed such that the output optical power of the pre-amplifier 110 is higher by 3 dB. However, in a WDM transmission system in which each reconfigurable optical add/drop multiplexer 100 operates independently, a gain control may be performed in the ROADM #1 and the ROADM #2 at the same time. In the example illustrated in FIG. 2, a gain control is performed at the time T1 in the ROADM #1 and the ROADM #2. In this case, the output optical power of the pre-amplifier 110 in the ROADM #2 is higher than the target level by 2 dB. In other words, an overshooting of an optical power occurs. When a WDM optical signal needs to pass through many ROADMs in a system, overshooting or undershooting may occur in a plurality of nodes and a communication state may become unstable.

This problem may be solved, for example, by correcting a gain of the pre-amplifier 110 more slowly. However, it is not preferable that the time needed for an optical power of a WDM optical signal to approach a target level be long.

The problem in which an optical power of a WDM optical signal is controlled improperly occurs not only in the control of the pre-amplifier 110. That is, this problem may also occur in the control of the wavelength selective switch 120 or the post-amplifier 130.

SUMMARY

According to an aspect of the present invention, an optical transmission device includes a first optical amplifier configured to amplify a wavelength division multiplexed optical signal received via an optical fiber; a wavelength selective switch configured to control optical powers of respective wavelength channels multiplexed in the wavelength division multiplexed optical signal that is amplified by the first optical amplifier; a second optical amplifier configured to amplify the wavelength division multiplexed optical signal output from the wavelength selective switch; and a processor configured to: control a gain of the first optical amplifier based on initial setting information, and correct the gain of the first optical amplifier such that an average optical power of a plurality of wavelength channels multiplexed in the wavelength division multiplexed optical signal that is amplified by the first optical amplifier approaches a target level after a specified period of time has elapsed from when the gain of the first optical amplifier is controlled based on the initial setting information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 3:
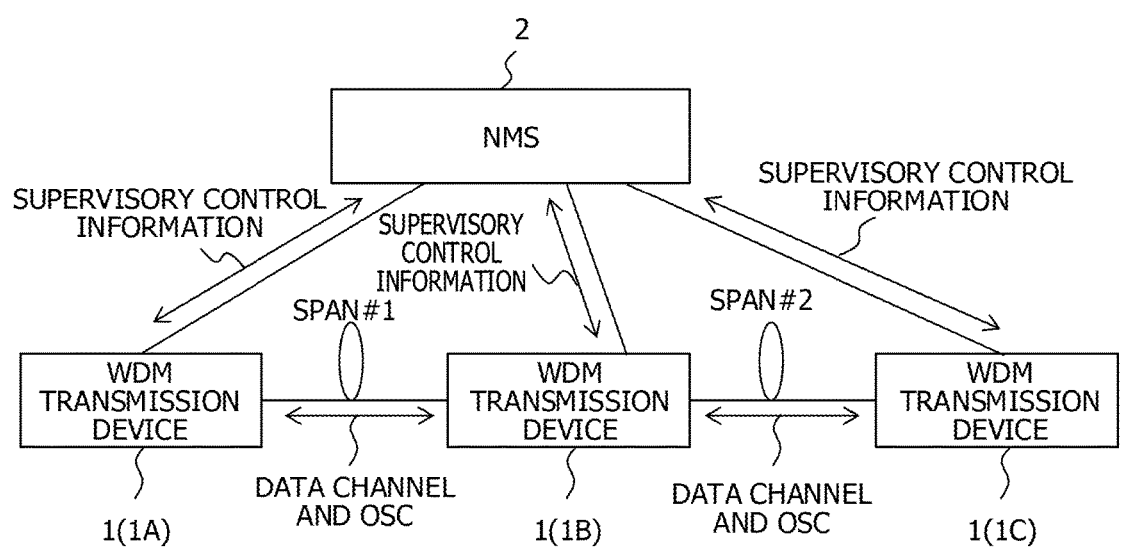
FIG. 3 illustrates an example of a WDM transmission system according to embodiments of the present invention.

FIG. 3 illustrates an example of a WDM transmission system according to embodiments of the present invention. In the example illustrated in FIG. 3, the WDM transmission system includes a plurality of WDM transmission devices 1 (1A-1C) and a network management system (NMS) 2.

The WDM transmission device 1 is implemented in each node in the WDM transmission system. The nodes are connected by optical fiber links. In the following descriptions, an optical link between two nodes adjacent to each other may be referred to as a "span". In the example illustrated in FIG. 3, a span #1 represents an optical link between the WDM transmission devices 1A and 1B, and a span #2 represents an optical link between the WDM transmission devices 1B and 1C.

The WDM transmission device 1 is an example of an optical transmission device that transmits a WDM optical signal. The WDM transmission device 1 is implemented by, for example, a reconfigurable optical add-drop multiplexer (ROADM). In this case, the WDM transmission device 1 can drop an optical signal of a desired wavelength channel from a WDM optical signal. Further, the WDM transmission device 1 can add an optical signal to an empty channel of a WDM optical signal.

A plurality of wavelength channels are multiplexed in a WDM optical signal. The plurality of wavelength channels include a plurality of data channels and an optical supervisory channel (OSC). Each of the plurality of data channels can transmit user data. The OSC transmits supervisory control information. The supervisory control information will be described later. The wavelength of the OSC is specified in advance.

The network management system 2 manages and controls a state of each of the WDM transmission devices 1 (1A-1C). The network management system 2 can collect supervisory control information from each of the WDM transmission devices 1, and can provide supervisory control information to each of the WDM transmission devices 1. The network management system 2 can establish an optical path requested by a user by controlling each of the WDM transmission devices 1.

First Embodiment

Figure 4:
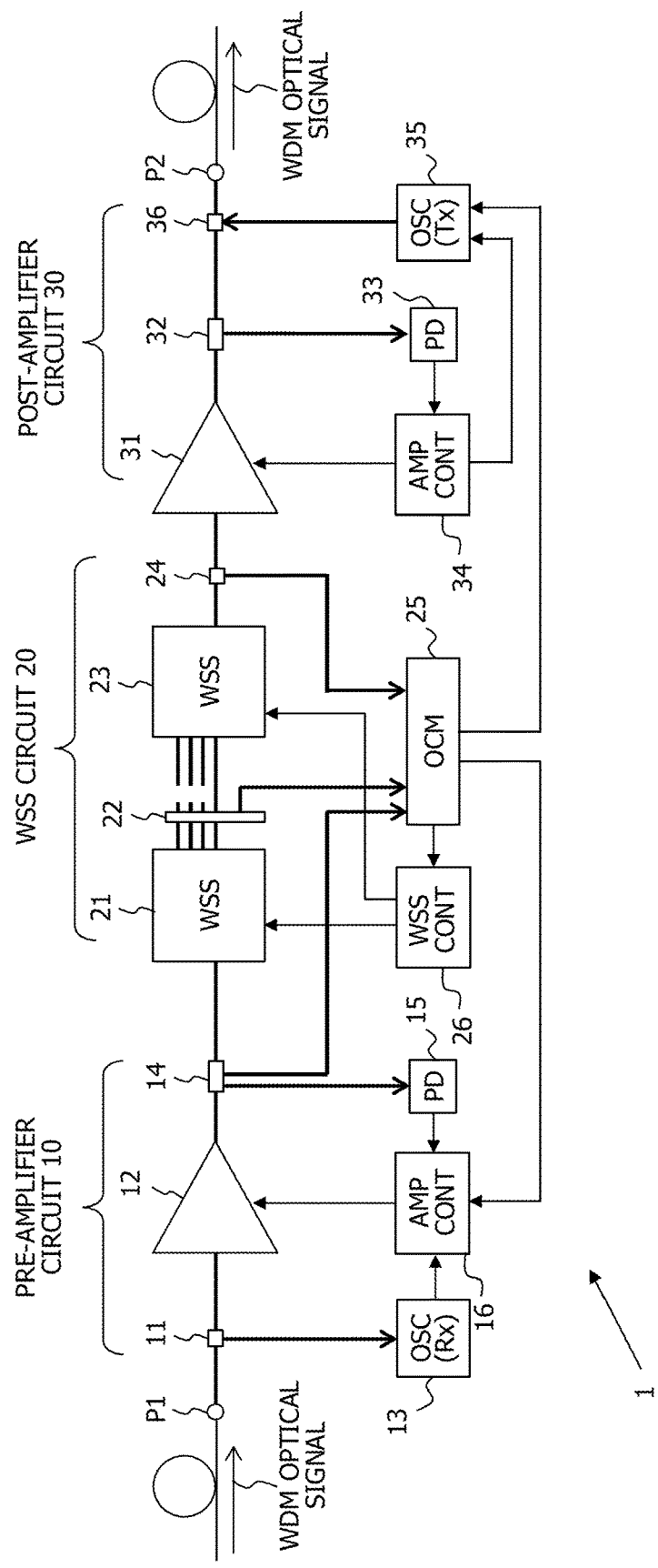
FIG. 4 illustrates an example of a WDM transmission device according to a first embodiment.

FIG. 4 illustrates an example of the WDM transmission device according to a first embodiment of the present invention. As illustrated in FIG. 4, the WDM transmission device 1 includes a pre-amplifier circuit 10, a WSS circuit 20, and a post-amplifier circuit 30. The WDM transmission device 1 may include other circuits that are not illustrated in FIG. 4.

The WDM transmission device 1 receives a WDM optical signal transmitted from an adjacent node. This WDM optical signal includes a plurality of data channels and an optical supervisory channel (OSC). Supervisory control information transmitted through the OSC includes information that indicates the number of wavelength channels in use and their allocation. Further, the supervisory control information may include information indicating an optical power of a WDM optical signal output from each node. Furthermore, the supervisory control information may include control completion information indicating that processing of controlling an optical power of a WDM optical signal has been completed. A WDM optical signal received via an optical fiber link is guided to the pre-amplifier circuit 10 via an input port P1.

In this example, the pre-amplifier circuit 10 includes an optical splitter 11, a pre-amplifier (pre-AMP) 12, an OSC receiver (OSC_Rx) 13, an optical splitter 14, an optical power monitor (PD) 15, and an amplifier controller 16. The pre-amplifier circuit 10 may include other circuit elements that are not illustrated in FIG. 4.

The optical splitter 11 splits a received WDM optical signal and guides the received WDM optical signal to the pre-amplifier 12 and the OSC receiver 13. The pre-amplifier 12 amplifies the received WDM optical signal. The preamplifier 12 is implemented by, for example, an erbium doped fiber amplifier (EDFA). A gain of the pre-amplifier 12 is controlled by the amplifier controller 16.

The OSC receiver 13 extracts an OSC signal (an optical signal transmitted through an optical supervisory channel) from the received WDM optical signal. In this case, the OSC receiver 13 includes, for example, an optical filter that extracts an OSC signal from a WDM optical signal. The OSC receiver 13 recovers supervisory control information from the extracted OSC signal. A WDM coupler that has a demultiplexing function may be used instead of the optical splitter 11. In this case, a WDM optical signal input to the WDM coupler is divided for data channels and an OSC channel. The data channels are guided to the pre-amplifier 12, and the OSC signal is guided to the OSC receiver 13.

The optical splitter 14 splits the WDM optical signal amplified by the pre-amplifier 12 and guides the WDM optical signal to the WSS circuit 20 and the optical power monitor 15. The optical power monitor 15 detects an optical power of the WDM optical signal amplified by the pre-amplifier 12. The optical power monitor 15 is implemented by, for example, a photo detector that includes a photodiode.

The amplifier controller 16 controls a gain of the pre-amplifier 12. For example, at the time of initial setting of the WDM transmission device 1, the amplifier controller 16 controls a gain of the pre-amplifier 12 based on initial setting information. Here, the amplifier controller 16 refers to an optical power detected by the optical power monitor 15 so as to control the gain of the pre-amplifier 12. Further, the amplifier controller 16 uses a result of measurement performed by an optical channel monitor 25 that will be described later, so as to control the gain of the pre-amplifier 12. Here, the amplifier controller 16 corrects the gain of the pre-amplifier 12 controlled in the initial setting.

The amplifier controller 16 is implemented by, for example, a digital signal processor or a digital signal processing circuit. A processor system that includes a processor and a memory is an example of the digital signal processor. An FPGA (field programmable gate array) is an example of the digital signal processing circuit.

A WDM optical signal amplified by the pre-amplifier circuit 10 is guided to the WSS circuit 20. In this example, the WSS circuit 20 includes a pre-WSS 21, an optical coupler/splitter 22, a post-WSS 23, an optical splitter 24, the optical channel monitor (OCM) 25, and a WSS controller 26. The WSS circuit 20 may include other circuit elements that are not illustrated in FIG. 4.

According to the instruction given by the WSS controller 26, the pre-WSS 21 processes the WDM optical signal amplified by the pre-amplifier circuit 10 for each wavelength channel. In this example, the pre-WSS 21 splits an optical signal of a specified wavelength from the WDM optical signal. The optical signal that is split by the pre-WSS 21 is guided to, for example, a client accommodated in the WDM transmission device 1. Further, the pre-WSS 21 controls an optical power of each wavelength channel multiplexed in the WDM optical signal amplified by the pre-amplifier circuit 10. This function permits the pre-WSS 21 to guide an optical signal of a specified wavelength channel to the post-WSS 23.

The optical coupler/splitter 22 combines optical signals output from the pre-WSS 21. An optical signal output from the optical coupler/splitter 22 is guided to the post-WSS 23 and the optical channel monitor 25. The optical signal output from the optical coupler/splitter 22 may be guided to other degrees.

The optical signal that has passed through the pre-WSS 21 is input to the post-WSS 23. An ADD optical signal may be input to the post-WSS 23. The ADD optical signal is generated by, for example, a client accommodated in the WDM transmission device 1. Then, the post-WSS 23 processes the input optical signal for each wavelength channel according to the instruction given by the WSS controller 26. For example, the post-WSS 23 inserts an ADD optical signal into an empty channel of the WDM optical signal. Further, the post-WSS 23 controls an optical power of each wavelength channel. The optical splitter 24 splits the WDM optical signal output from the post-WSS 23 and guides the WDM optical signal to the post-amplifier circuit 30 and the optical channel monitor 25.

The optical channel monitor 25 measures a spectrum of input light so as to detect an optical power of each wavelength channel in a WDM optical signal. In this example, one of a WDM optical signal output from the pre-amplifier 12, a WDM optical signal output from the pre-WSS 21, and a WDM optical signal output from the post-WSS 23 is selected by an optical switch (not illustrated) and guided to the optical channel monitor 25. The optical channel monitor 25 detects an optical power of each wavelength channel of the input WDM optical signal. A result of the detection performed by the optical channel monitor 25 is provided to the amplifier controller 16, the WSS controller 26, and an OSC transmitter 35.

The WSS controller 26 controls an optical power of each wavelength channel in the pre-WSS 21 and an optical power of each wavelength channel in the post-WSS 23 based on the detection result from the optical channel monitor 25. In this example, the WSS controller 26 adjusts an attenuation amount of each wavelength channel in the pre-WSS 21 based on an optical power of each wavelength channel in the WDM optical signal output from the pre-WSS 21. Further, the WSS controller 26 adjusts an attenuation amount of each wavelength channel in the post-WSS 23 based on an optical power of each wavelength channel in the WDM optical signal output from the post-WSS 23. Here, each of the optical powers of each wavelength channel is adjusted at a target level specified in advance.

The WSS controller 26 is implemented by, for example, a digital signal processor or a digital signal processing circuit. A processor system that includes a processor and a memory is an example of the digital signal processor. An FPGA is an example of the digital signal processing circuit.

A WDM optical signal processed by the WSS circuit 20 is guided to the post-amplifier circuit 30. In this example, the post-amplifier circuit 30 includes a post-amplifier (post-AMP) 31, an optical splitter 32, an optical power monitor (PD) 33, an amplifier controller 34, the OSC transmitter (OSC_Tx) 35, and a combiner 36. The post-amplifier circuit 30 may include other circuit elements that are not illustrated in FIG. 4.

The post-amplifier 31 amplifies the WDM optical signal processed by the WSS circuit 20. The post-amplifier 31 is implemented by, for example, an erbium doped fiber amplifier (EDFA). A gain of the post-amplifier 31 is controlled by the amplifier controller 34.

The optical splitter 32 splits the WDM optical signal amplified by the post-amplifier 31 and guides the WDM optical signal to an output port P2 and the optical power monitor 33. The optical power monitor 33 detects an optical power of the WDM optical signal amplified by the pre-amplifier 31. The optical power monitor 33 is implemented by, for example, a photo detector that includes a photodiode.

The amplifier controller 34 controls a gain of the pre-amplifier 31 based on an optical power detected by the optical power monitor 33. In this example, the amplifier controller 34 controls a gain of the pre-amplifier 31 such that an optical power of a WDM optical signal output from the pre-amplifier 31 approaches a target output level.

The amplifier controller 34 is implemented by, for example, a digital signal processor or a digital signal processing circuit. A processor system that includes a processor and a memory is an example of the digital signal processor. An FPGA is an example of the digital signal processing circuit.

The OSC transmitter 35 generates an OSC signal that carries supervisory control information. The supervisory control information includes information that indicates the number of wavelength channels in use and their allocation. The wavelength channel in use is detected by the optical channel monitor 25. Further, the supervisory control information may include output optical power information indicating an optical power of a WDM optical signal output from the WDM transmission device 1. The output optical power information is generated based on a target output level used by the amplifier controller 34. Furthermore, the supervisory control information may include control completion information indicating that processing of controlling an optical power of a WDM optical signal has been completed. The control completion information is generated according to operational states of the amplifier controller 16, the WSS controller 26, and the amplifier controller 34.

The combiner 36 combines a WDM optical signal output from the post-amplifier 31 and an OSC signal generated by the OSC transmitter 35. In other words, the OSC signal is inserted into the output WDM optical signal. Then, the WDM transmission device 1 outputs, via the output port P2, the WDM optical signal in which a plurality of data signals and the OSC signal are multiplexed. This WDM optical signal is transmitted to an adjacent node via an optical fiber link.

The amplifier controller 16, the WSS controller 26, and the amplifier controller 34 may be implemented by a single digital signal processor (or a single digital signal processing circuit). Alternatively, the amplifier controller 16, the WSS controller 26, and the amplifier controller 34 may be individually implemented by respective digital signal processors (or individual digital signal processing circuits).

Figure 5:
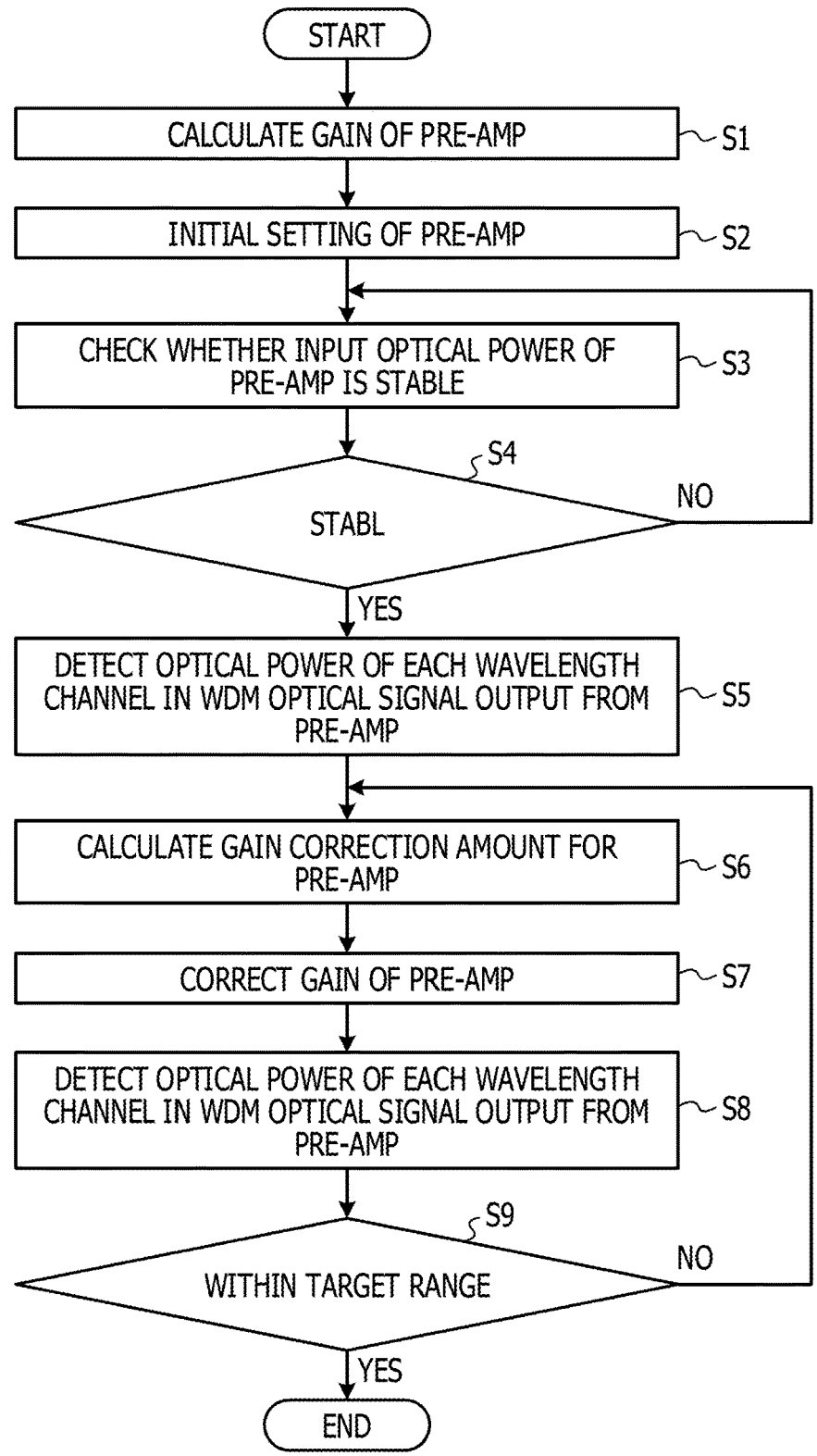
FIG. 5 is a flowchart that illustrates an example of a method for controlling a gain of a pre-amplifier.

FIG. 5 is a flowchart that illustrates an example of a method for controlling a gain of the pre-amplifier 12. Processing of this flowchart is performed, for example, when the WDM transmission device 1 is started.

In S1, the amplifier controller 16 calculates an initial gain of the pre-amplifier 12. The initial gain is calculated based on an output optical power of an adjacent node, span information, and a target value of an output optical power of the pre-amplifier 12. The output optical power of an adjacent node is reported, for example, from the adjacent node by an OSC signal. Alternatively, the output optical power of an adjacent node is reported from the network management system 2. The span information represents an optical loss in an optical link between an adjacent node and the WDM transmission device 1. It is assumed that the span information is measured in advance. It is assumed that the target value of an output optical power of the pre-amplifier 12 is given in advance.

Figure 6:
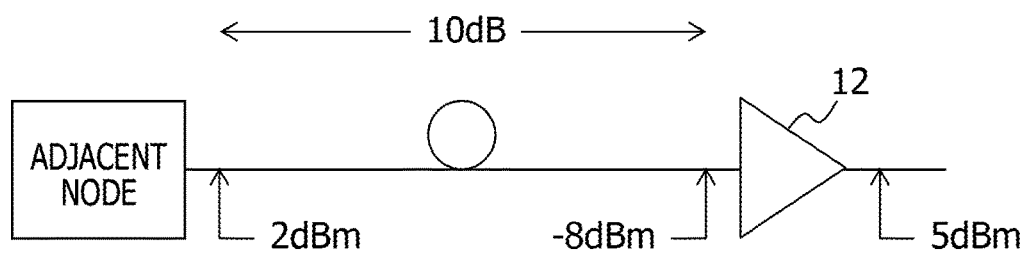
FIG. 6 illustrates an example of a method for calculating an initial gain of the pre-amplifier.

FIG. 6 illustrates an example of a method for calculating an initial gain of the pre-amplifier 12. In the example illustrated in FIG. 6, the output optical power of each wavelength channel in an adjacent node is 2 dBm. The optical loss in an optical link between the adjacent node and the WDM transmission device 1 is 10 dB. In this case, the input optical power of the WDM transmission device 1 is −8 dBm. Here, it is assumed that the target value of an optical power of each wavelength channel in a WDM optical signal output from the pre-amplifier 12 is 5 dBm. In this case, the initial gain of the pre-amplifier 12 is 13 dB.

In S2, the amplifier controller 16 configures the pre-amplifier 12 with the initial gain calculated in S1. Then, the amplifier controller 16 starts the pre-amplifier 12. After that, the pre-amplifier 12 amplifies an optical signal with the initial gain.

In S3 and S4, the amplifier controller 16 checks whether an input optical power of the pre-amplifier 12 is stable. For example, the amplifier controller 16 measures an output optical power of the pre-amplifier 12 multiple times while the gain of the pre-amplifier 12 is fixed, using the optical power monitor 15. When a variation in value between the measured plurality of optical powers is less than a specified threshold, the amplifier controller 16 decides that the input optical power of the pre-amplifier 12 is stable. Note that an optical power monitor (such as a photo detector) may be provided on the input side of the pre-amplifier 12 so as to check whether the input optical power of the pre-amplifier 12 is stable.

When the input optical power of the pre-amplifier 12 has been decided to be stable, the amplifier controller 16 detects an optical power of each wavelength channel in a WDM optical signal output from the pre-amplifier 12 in S5. The optical power of each wavelength channel is measured by the optical channel monitor 25.

In S6, the amplifier controller 16 calculates a gain correction amount for correcting a gain of the pre-amplifier 12 based on an optical power of each wavelength channel. In this example, the gain correction amount is calculated such that an average optical power of the respective wavelength channels approaches a target level.

Figure 7:
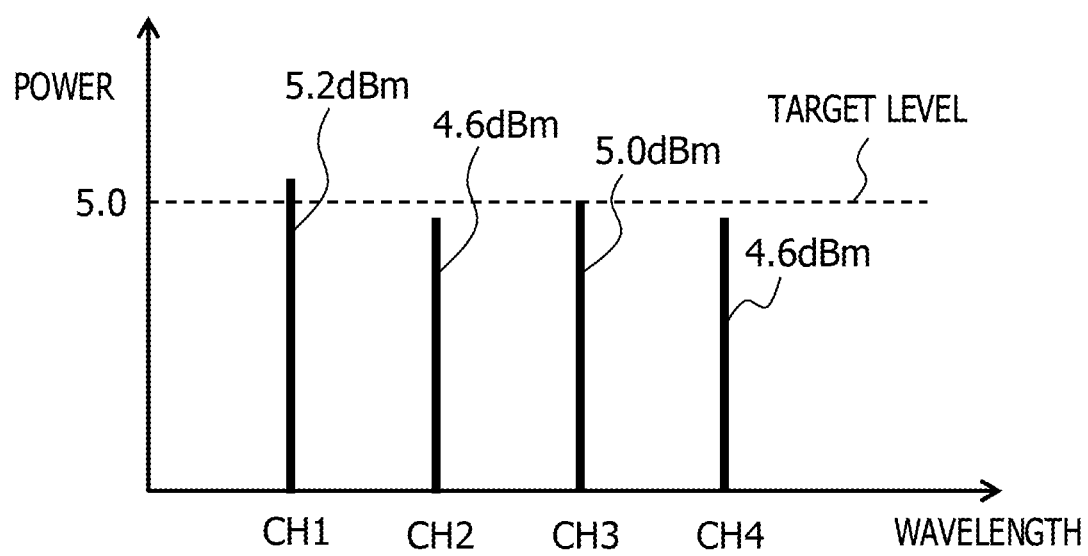
FIG. 7 illustrates an example of calculating a gain correction amount.

FIG. 7 illustrates an example of calculating a gain correction amount. In this example, wavelength channels CH1 to CH4 are multiplexed in a WDM optical signal output from the pre-amplifier 12. The target level is 5.0 dBm. An optical power of each wavelength channel in the WDM optical signal output from the pre-amplifier 12 is measured by the optical channel monitor 25. In this example, an average optical power of the wavelength channels CH1 to CH4 is 4.85 dBm. In other words, the average optical power of the wavelength channels CH1 to CH4 is lower than the target level by 0.15 dB. In this case, the gain correction amount is "+0.15 dB".

In S7, the amplifier controller 16 corrects a gain of the pre-amplifier 12 based on a result of the calculation in S6. In the example illustrated in FIG. 7, the amplifier controller 16 increases the gain of the pre-amplifier 12 by 0.15 dB. After that, in S8, the amplifier controller 16 detects the optical power of each wavelength channel output from the pre-amplifier 12. As in S5, the optical power of each wavelength channel is measured by the optical channel monitor 25.

In S9, the amplifier controller 16 calculates a difference between the average optical power of the respective wavelength channels and the target level. When the difference is greater than a specified threshold, the process of the amplifier controller 16 returns to S6. This threshold is determined such that an average optical power of wavelength channels is sufficiently close to a target level. This threshold is, for example, about 0.1 dB.

The amplifier controller 16 performs the processes of S6 to S9 repeatedly until the difference between the average optical power of the respective wavelength channels and the target level is less than the threshold. When the difference between the average optical power of the respective wavelength channels and the target level is less than the threshold, the amplifier controller 16 fixes the gain of the pre-amplifier 12 and terminates the processing of controlling a gain.

As described above, in the method for controlling a gain according to the embodiment, an optical power of each wavelength channel in a WDM optical signal is measured using the optical channel monitor 25, and a gain of the pre-amplifier 12 is adjusted such that the average of these optical powers approaches a target level. Thus, the gain of the pre-amplifier 12 can be adjusted accurately even when the ASE (amplified spontaneous emission) of input light of the WDM transmission device 1 is large. When the gain of the pre-amplifier 12 is adjusted using a photo detector (the optical power monitor 15 in FIG. 4), the ASE of input light needs to be estimated to be compensated for. However, it is not easy to estimate the ASE of input light accurately. Thus, when the gain of the pre-amplifier 12 is adjusted using a photo detector, it may be difficult to adjust the gain of the pre-amplifier 12 accurately.

Further, in the method for controlling a gain according to the embodiment, an initial gain of the pre-amplifier 12 is calculated when the WDM transmission device 1 is started, and the pre-amplifier 12 is then started with this initial gain. Here, the initial gain is calculated based on, for example, an output optical power of an adjacent node and span information so as to be close to a preferable gain. Thus, a period of time needed to correct a gain of the pre-amplifier 12 using the optical channel monitor 25 is short. In the example illustrated in FIG. 5, the number of repetition of the processes of S6 to S9 is reduced.

Figure 1:
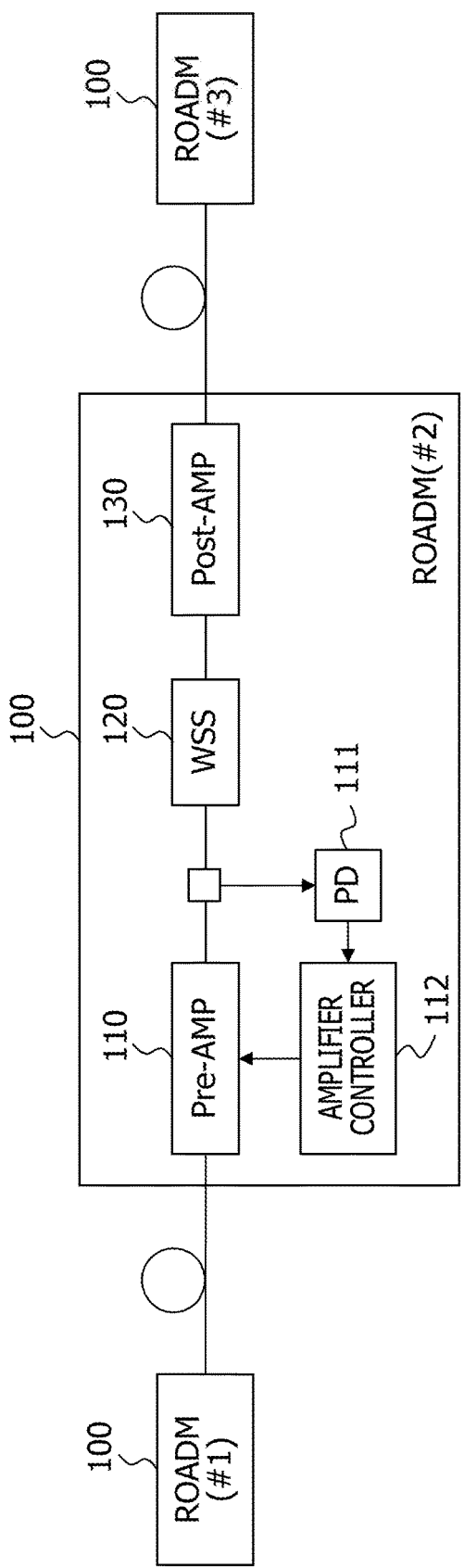
FIG. 1 illustrates an example of a WDM transmission system.
Figure 2:
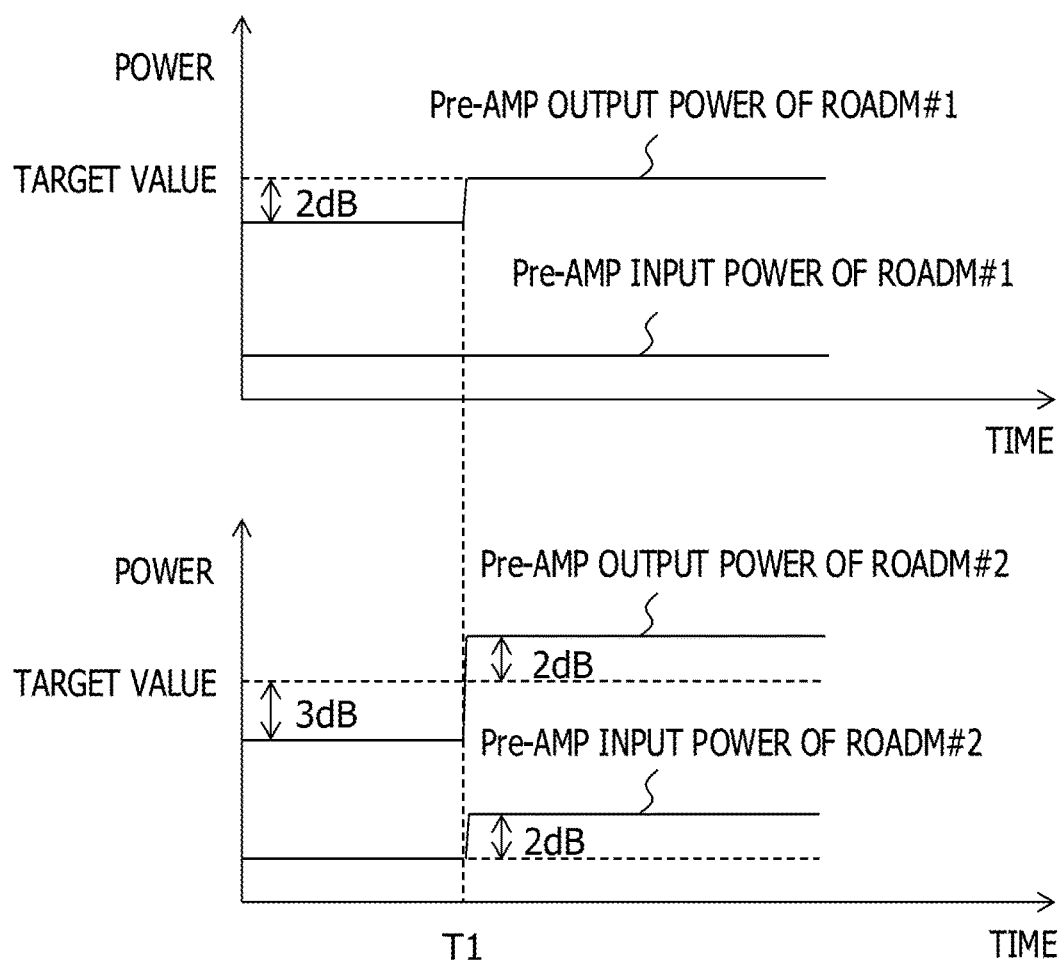
FIG. 2 illustrates an example in which an optical power of a WDM optical signal is controlled improperly.

Furthermore, in the method for controlling a gain according to the embodiment, the procedure of correcting a gain of the pre-amplifier 12 using the optical channel monitor 25 is performed after the input optical power of the pre-amplifier 12 has been decided to be stable. This prevents the gain of the pre-amplifier 12 from being corrected excessively. In other words, an overshooting (or an undershooting) of an optical power that is illustrated in FIG. 2 is suppressed.

In the example described above, the amplifier controller 16 measures an output optical power of the pre-amplifier 12 so as to decide whether an input optical power is stable, but the present invention is not limited to this method. For example, in a WDM transmission system in which control completion information is transmitted using an OSC, the WDM transmission device 1 may decide that an input optical power is stable when the WDM transmission device 1 receives the control completion information from an adjacent node (in other words, a source node of the WDM optical signal). Alternatively, in a WDM transmission system in which control completion information is transmitted through the network management system 2, the WDM transmission device 1 may decide that an input optical power is stable when the WDM transmission device 1 receives information on the completion of controlling an adjacent node through the network management system 2. Further, the amplifier controller 16 may decide whether an input optical power is stable using both of the measurement and the control completion information.

The WDM transmission device 1 may receive control start information that indicates the start of controlling the WDM transmission device 1 instead of information on the completion of controlling an adjacent node (in other words, a source node of a WDM optical signal) when the control of the adjacent node has been completed. In this case, the WDM transmission device 1 may decide that an input optical power is stable when the WDM transmission device 1 receives the control start information.

Figure 8:
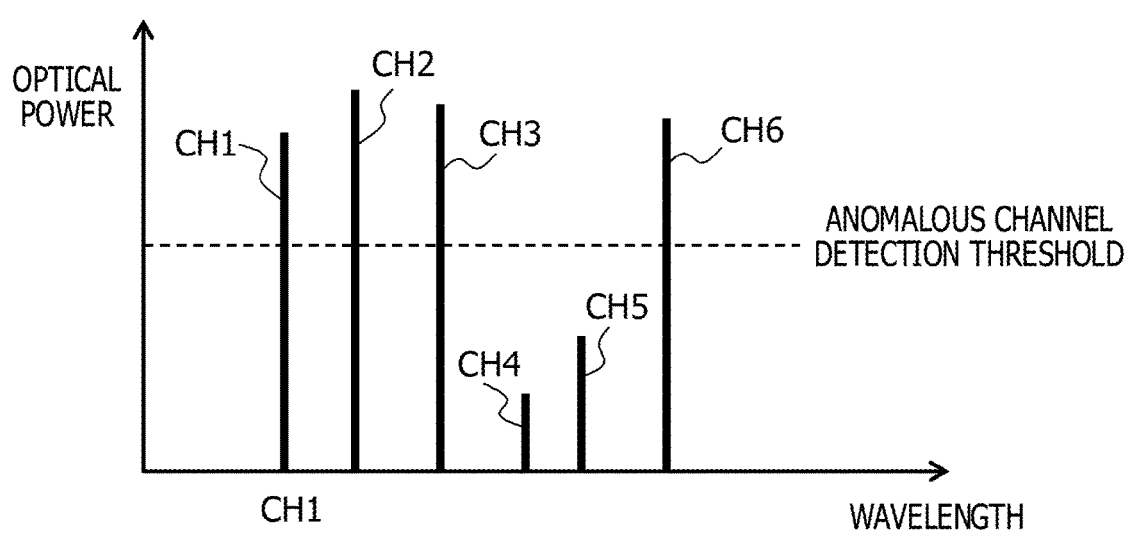
FIG. 8 illustrates another example of the method for controlling a gain of the pre-amplifier.

In S5 to S8, the amplifier controller 16 may calculate an average optical power of some of the wavelength channels in a WDM optical signal, not an average optical power of all of the wavelength channels. For example, in the example illustrated in FIG. 8, wavelength channels CH1 to CH6 are multiplexed in a WDM optical signal. However, optical powers of the wavelength channels CH4 and CH5 that are detected by the optical channel monitor 25 are lower than an anomalous channel detection threshold. In this case, the amplifier controller 16 excludes the wavelength channels CH4 and CH5 when the amplifier controller 16 calculates an average optical power of a wavelength channel. In other words, the amplifier controller 16 calculates an average of optical powers of the wavelength channels CH1 to CH3 and CH6. The anomalous channel detection threshold may be determined such that an anomalous wavelength channel is avoided from calculation of the average optical power.

When an average optical power is calculated without excluding an anomalous wavelength channel (in this case, a wavelength channel having a significantly low optical power) and a gain of the pre-amplifier 12 is calculated based on this average optical power, the gain may be corrected excessively. Thus, in an embodiment, an anomalous wavelength channel is excluded when an average optical power is calculated. Therefore, a gain of the pre-amplifier 12 is not corrected excessively, and an optical power of a WDM optical signal that is output from the pre-amplifier 12 is controlled accurately at a target level.

Second Embodiment

In the example illustrated in FIGS. 4 and 5, the procedure of controlling a gain of the pre-amplifier 12 has been described, wherein operational states of the pre-WSS 21, the post-WSS 23, and the pre-amplifier 31 are also configured in the WDM transmission device 1. In a second embodiment, operational states of the pre-amplifier 12, the pre-WSS 21, the post-WSS 23, and the pre-amplifier 31 are configured.

Figure 9:
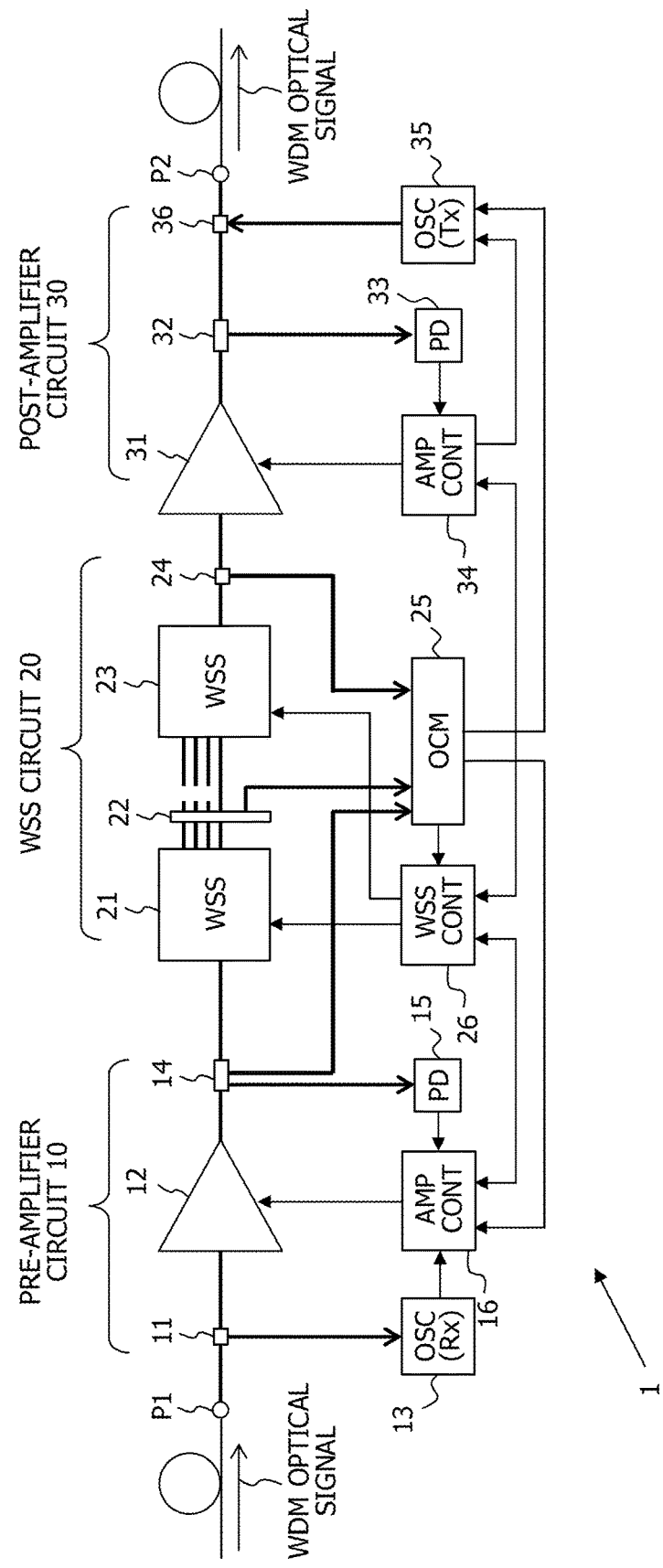
FIG. 9 illustrates an example of the WDM transmission device according to a second embodiment.

FIG. 9 illustrates an example of the WDM transmission device according to the second embodiment. As in the first embodiment, the WDM transmission device of the second embodiment includes the pre-amplifier circuit 10, the WSS circuit 20, and the post-amplifier circuit 30. However, in the second embodiment, the amplifier controller 16, the WSS controller 26, and the amplifier controller 34 operate in cooperation with one another. Specifically, the WSS controller 26 performs the settings of the pre-WSS 21 and the post-WSS 23 after the setting of the pre-amplifier 12 performed by the amplifier controller 16 has been completed. Further, the amplifier controller 34 performs the setting of the pre-amplifier 31 after the settings of the pre-WSS 21 and the post-WSS 23 performed by the WSS controller 26 have been completed.

Figure 10:
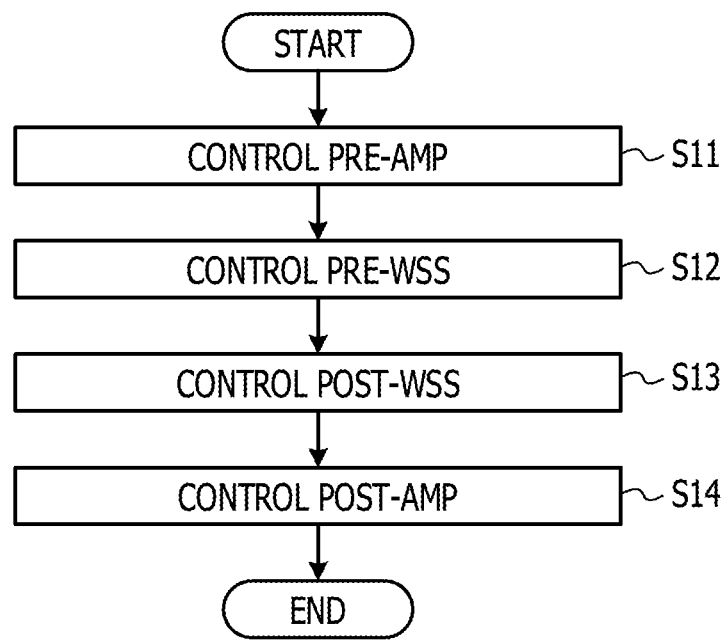
FIG. 10 is a flowchart that illustrates an example of a method for controlling an optical power in the WDM transmission device.

FIG. 10 is a flowchart that illustrates an example of a method for controlling an optical power in the WDM transmission device. Processing of this flowchart is performed, for example, when the WDM transmission device 1 is started.

In S11, the amplifier controller 16 controls a gain of the pre-amplifier 12. When the amplifier controller 16 has completed the control of a gain of the pre-amplifier 12, the amplifier controller 16 transmits control completion information to the WSS controller 26.

When the WSS controller 26 receives the control completion information from the amplifier controller 16, the WSS controller 26 performs the process of S12. In S12, the WSS controller 26 controls an attenuation amount of each wavelength channel in the pre-WSS 21 so as to adjust an optical power of each wavelength channel. When the WSS controller 26 has completed the control of the pre-WSS 21, the WSS controller 26 controls, in S13, an attenuation amount of each wavelength channel in the post-WSS 23 so as to adjust an optical power of each wavelength channel. Then, when the WSS controller 26 has completed the control of the post-WSS 23, the WSS controller 26 transmits control completion information to the amplifier controller 34.

When the amplifier controller 34 receives the control completion information from the WSS controller 26, the amplifier controller 34 performs the process of S14. In S14, the amplifier controller 34 controls a gain of the post-amplifier 31. When the amplifier controller 34 has completed the control of the post-amplifier 31, the amplifier controller 34 transmits control completion information to an adjacent node (an adjacent node that receives a WDM optical signal transmitted from the WDM transmission device 1). This control completion information is transmitted using an OSC. The control completion information may be transmitted to the network management system 2. In this case, the control completion information is forwarded from the network management system 2 to the adjacent node.

As described above, the settings of the pre-amplifier 12, the pre-WSS 21, the post-WSS 23, and the post-amplifier 31 are performed sequentially from the upstream to the downstream of a WDM optical signal. In other words, the settings of the pre-amplifier 12, the pre-WSS 21, the post-WSS 23, and the post-amplifier 31 are not performed at the same time. This makes it possible to control an optical power of a WDM optical signal and an optical power of each wavelength channel in the WDM optical signal stably when the setting of the WDM transmission device 1 is performed.

Figure 11:
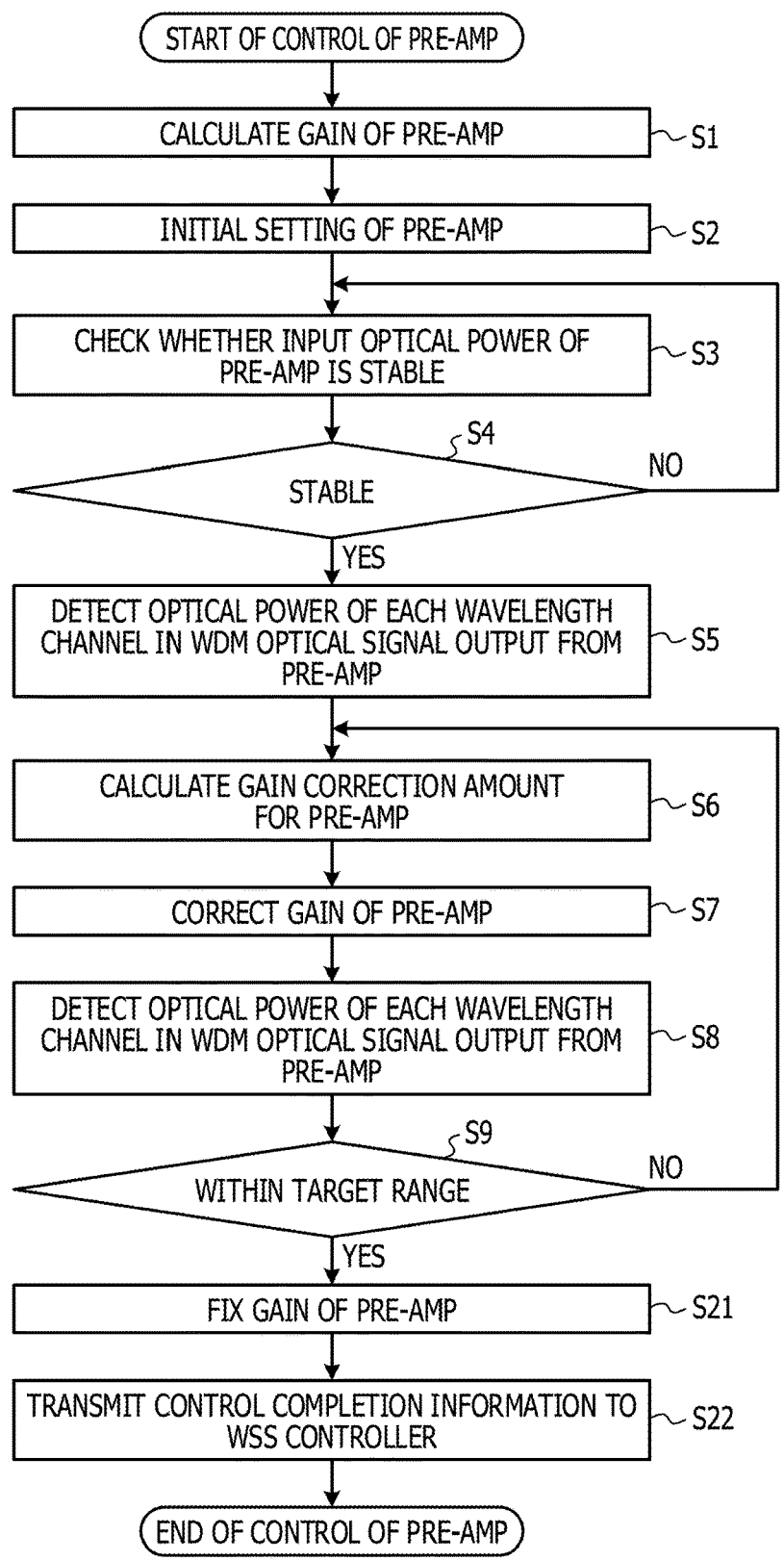
FIG. 11 is a flowchart that illustrates an example of the method for controlling a gain of the pre-amplifier in the second embodiment.

FIG. 11 is a flowchart that illustrates an example of the method for controlling a gain of the pre-amplifier in the second embodiment. Processing of this flowchart corresponds to S11 of FIG. 10. The processes of S1 to S9 are substantially the same in FIGS. 5 and 11, so their description is omitted.

When the average optical power of the respective wavelength channels in the WDM optical signal output from the pre-amplifier 12 approaches the target level sufficiently, the amplifier controller 16 fixes a gain of the pre-amplifier 12 in S21. After that, the pre-amplifier 12 operates in an AGC mode in which an input WDM optical signal is amplified with a fixed gain. Then, in S22, the amplifier controller 16 reports, to the WSS controller 26, control completion information indicating that the control of a gain of the pre-amplifier 12 has been completed.

The amplifier controller 16 may receive, before S1, control completion information transmitted from the network management system 2 or an adjacent node. In this case, the amplifier controller 16 may start controlling a gain of the pre-amplifier 12 after the amplifier controller 16 receives the control completion information.

Figure 12:
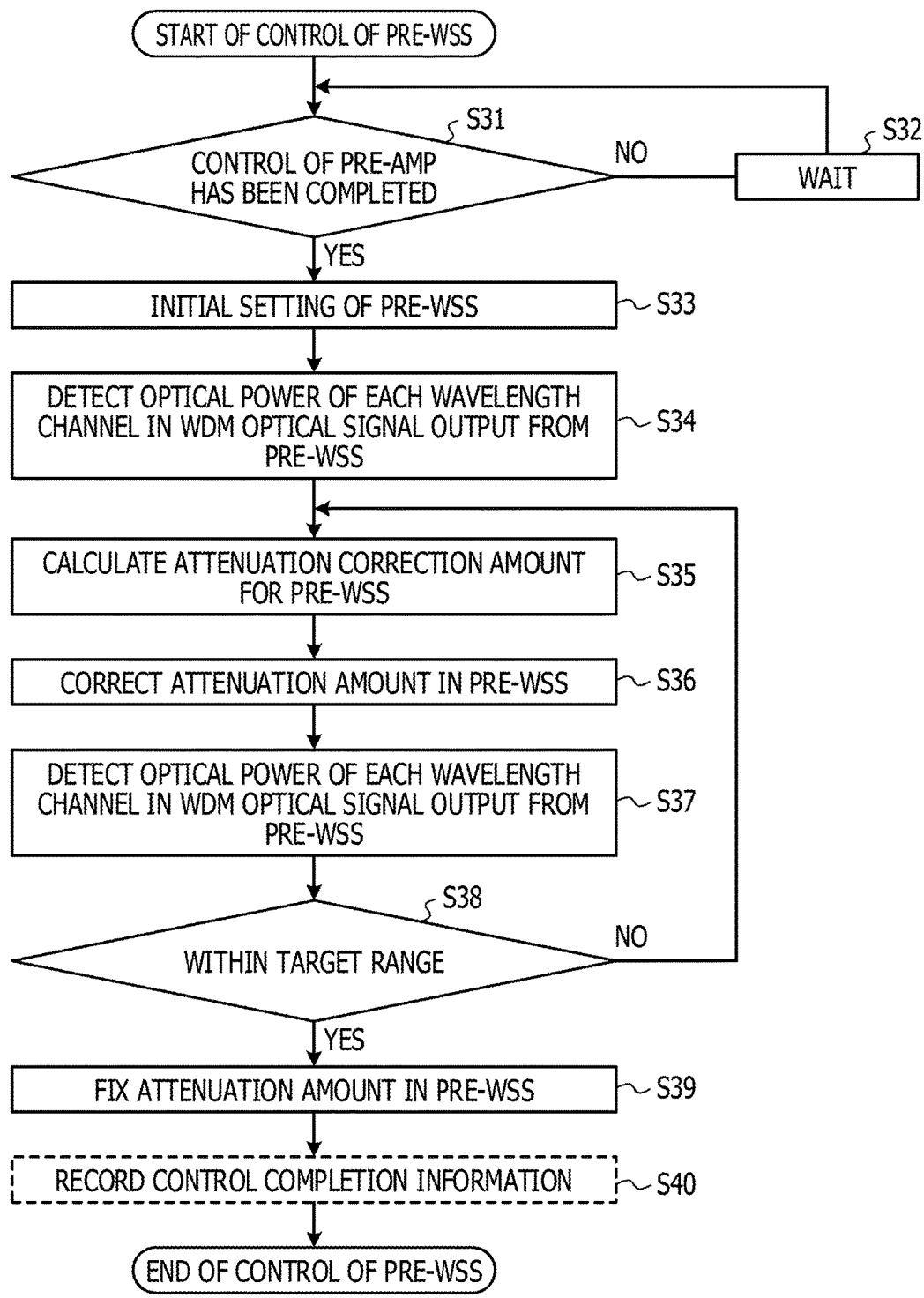
FIG. 12 is a flowchart that illustrates an example of a method for controlling an attenuation amount in a pre-WSS in the second embodiment.

FIG. 12 is a flowchart that illustrates an example of a method for controlling an attenuation amount in the pre-WSS 21 in the second embodiment. Processing of this flowchart corresponds to S12 of FIG. 10.

In S31 and S32, the WSS controller 26 decides whether the control of a circuit on an input side has been completed. In other words, the WSS controller 26 decides whether the control of a gain of the pre-amplifier 12 has been completed. In this example, when control completion information is given to the WSS controller 26 by the amplifier controller 16, the WSS controller 26 decides that the control of a gain of the pre-amplifier 12 has been completed. When the control of a gain of the pre-amplifier 12 has been completed, the process of the WSS controller 26 moves on to S33.

In S33, the WSS controller 26 performs an initial setting of the pre-WSS 21. An attenuation amount of each wavelength channel is controlled in the initial setting. An attenuation amount of a wavelength channel through which an optical signal passes is configured to be an initial attenuation amount specified in advance. For example, it is assumed that the target level of an optical power of each wavelength channel in a WDM optical signal output from the pre-amplifier 12 is 5 dBm and the target level of an optical power of each wavelength channel in a WDM optical signal output from the pre-WSS 21 is −5 dBm. In this case, the initial attenuation amount is 10 dB. Initial setting information that indicates the initial attenuation amount is stored in a memory that can be accessed by the WSS controller 26. The attenuation amount of a wavelength channel that blocks an optical signal is configured to be a maximum value. Then, the WSS controller 26 starts the pre-WSS 21. After that, the pre-WSS 21 processes an optical signal of each wavelength channel in the initial state.

In S34, the WSS controller 26 detects an optical power of each wavelength channel in the WDM optical signal output from the pre-WSS 21. The optical power of each wavelength channel is measured by the optical channel monitor 25.

In S35, the WSS controller 26 calculates an attenuation correction amount for each wavelength channel based on a result of the detection in S34. In this example, the attenuation correction amount is calculated such that the optical power of each wavelength channel approaches a target level.

In S36, the WSS controller 26 corrects the attenuation amount of each wavelength channel in the pre-WSS 21 based on a result of the calculation in S35. Then, in S37, the WSS controller 26 detects an optical power of each wavelength channel in the WDM optical signal output from the pre-WSS 21. As in S34, the optical power of each wavelength channel is measured by the optical channel monitor 25.

In S38, the WSS controller 26 calculates a difference between the optical power of each wavelength channel and a target level. When a wavelength channel whose difference is greater than a specified threshold remains, the process of the WSS controller 26 returns to S35. This threshold is determined such that the optical power of the wavelength channel approaches the target level sufficiently. The threshold is, for example, about 0.1 dB.

The WSS controller 26 performs the processes of S35 to S38 repeatedly until the difference between the optical power of each wavelength channel and the target level is less than the threshold. When the difference between the optical power of each wavelength channel and the target level is less than the threshold, the WSS controller 26 fixes the attenuation amount in the pre-WSS 21 in S39.

In S40, the WSS controller 26 generates control completion information indicating that the control of an attenuation amount in the pre-WSS 21 has been completed. This control completion information may be recorded in the WSS controller 26.

Figure 13:
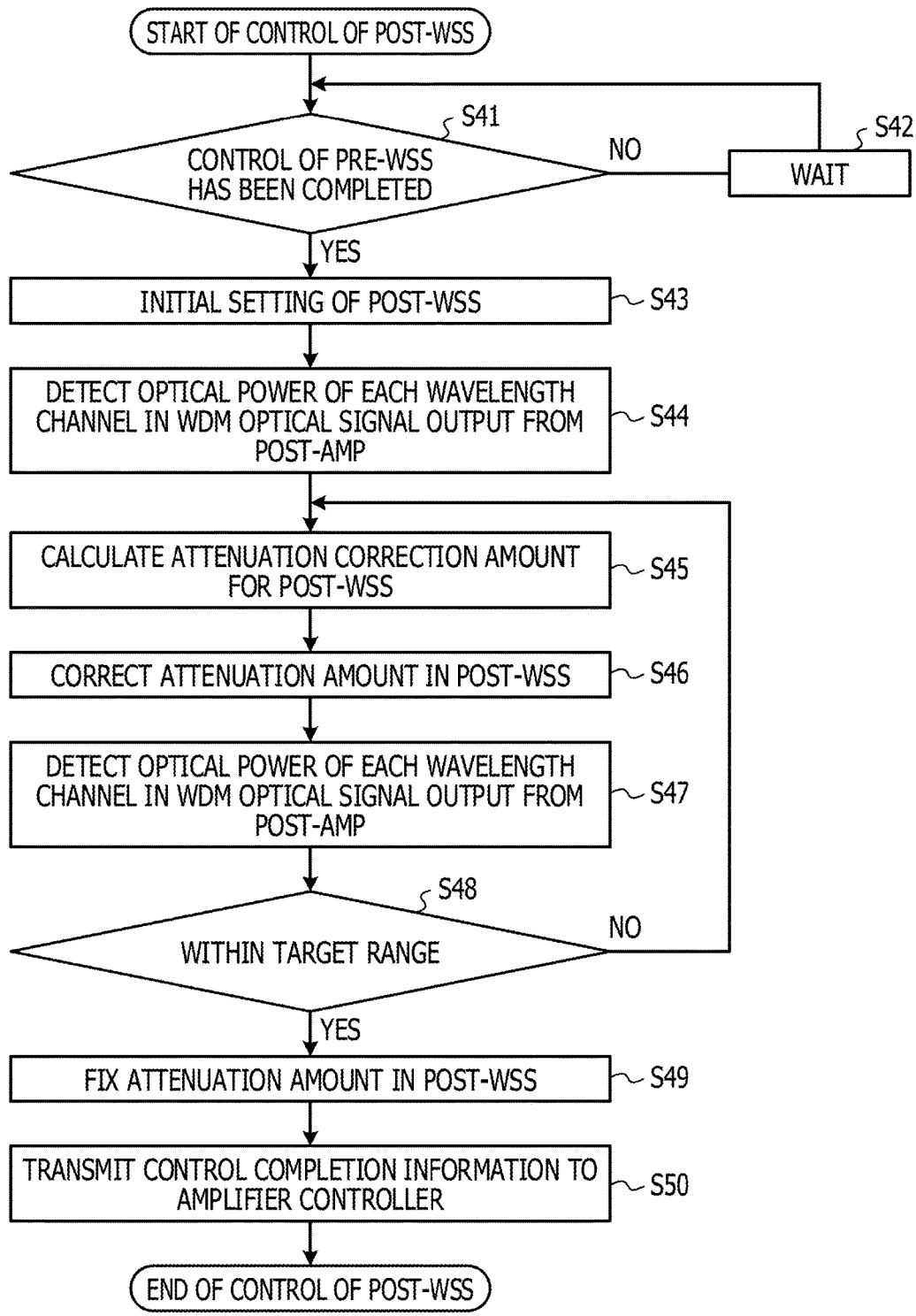
FIG. 13 is a flowchart that illustrates an example of a method for controlling an attenuation amount in a post-WSS in the second embodiment.

FIG. 13 is a flowchart that illustrates an example of a method for controlling an attenuation amount in the post- WSS 23 in the second embodiment. Processing of this flowchart corresponds to S13 of FIG. 10.

S41 to S50 that control an attenuation amount in the post-WSS 23 are substantially the same as S31 to S40 that control an attenuation amount in the pre-WSS 21. However, when control completion information indicating that the control of an attenuation amount in the pre-WSS 21 has been completed is recorded in the WSS controller 26 in S41 and S42, the process of the WSS controller 26 moves on to S43. In S43 to S49, the WSS controller 26 monitors an optical power of each wavelength channel of a WDM optical signal output from the post-WSS 23, and corrects an attenuation amount of each wavelength channel in the post-WSS 23 using a result of the monitoring. In S50, the WSS controller 26 reports, to the amplifier controller 34, control completion information indicating that the control of an attenuation amount in the post-WSS 23 (or the control of an optical power in the WSS circuit 20) has been completed.

Figure 14:
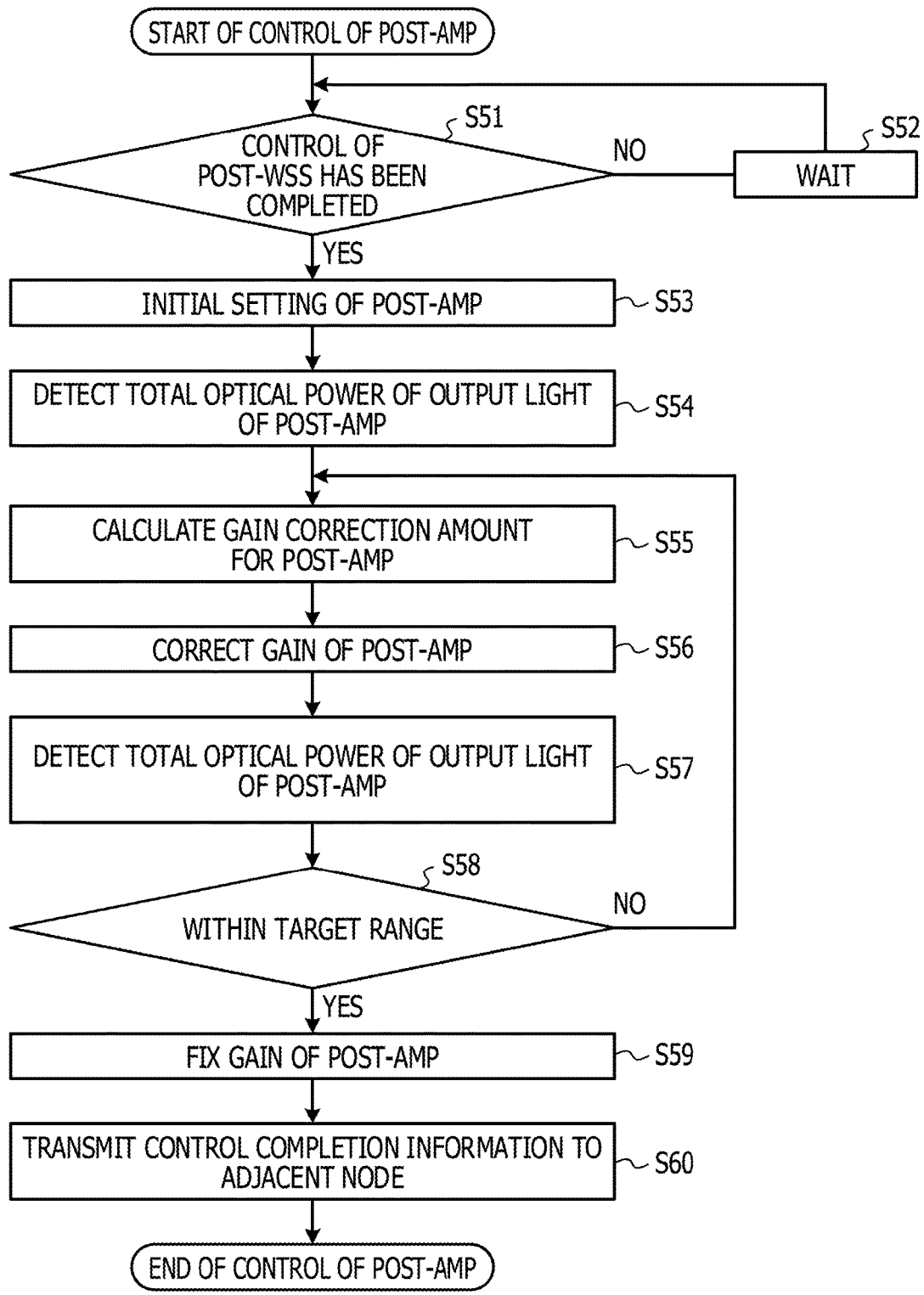
FIG. 14 is a flowchart that illustrates an example of a method for controlling a gain of a post-amplifier in the second embodiment.

FIG. 14 is a flowchart that illustrates an example of a method for controlling a gain of the post-amplifier in the second embodiment. Processing of this flowchart corresponds to S14 of FIG. 10.

In S51 and S52, the amplifier controller 34 decides whether the control of a circuit on an input side has been completed. In other words, the amplifier controller 34 decides whether the control of an attenuation amount in the post-WSS 23 has been completed. In this example, when control completion information is given to the amplifier controller 34 by the WSS controller 26, the amplifier controller 34 decides that the control of the post-WSS 23 has been completed. When the control of the post-WSS 23 has been completed, the process of the amplifier controller 34 moves on to S53.

In S53, the amplifier controller 34 configures an initial gain in the post-amplifier 31. For example, the initial gain is determined in advance based on a target value of an average optical power of the respective wavelength channels in the WDM optical signal output from the post-WSS 23 and a target value of an average optical power of respective wavelength channels in a WDM optical signal output from the post-amplifier 31. Initial setting information that indicates the initial gain is stored in a memory that can be accessed by the amplifier controller 34. Then, the amplifier controller 34 starts the post-amplifier 31. After that, the post-amplifier 31 amplifies an optical signal with the initial gain.

S54 to S58 and S59 that control a gain of the post-amplifier 31 are substantially the same as S5 to S9 and S21 that control a gain of the pre-amplifier 12. However, in S54 and S57, the amplifier controller 34 detects a total optical power in the WDM optical signal output from the post-amplifier 31 using the optical power monitor 33, and calculates an average optical power of the respective wavelength channels based on the detected total optical power and the number of wavelength channels in the WDM optical signal. In S55, the amplifier controller 34 calculates a gain correction amount for the post-amplifier 31 based on the average optical power obtained in S54 and a target level. In S58, the amplifier controller 34 decides whether the average optical power obtained in S57 is sufficiently close to the target level.

Then, in S60, the amplifier controller 34 transmits, to an adjacent node or the network management system 2, control completion information indicating that the control of a gain of the post-amplifier 31 (or the control of an optical power in the WDM transmission device 1) has been completed. When the control completion information is transmitted to the adjacent node, the control completion information is transmitted using, for example, an OSC in the WDM optical signal.

Figure 15:
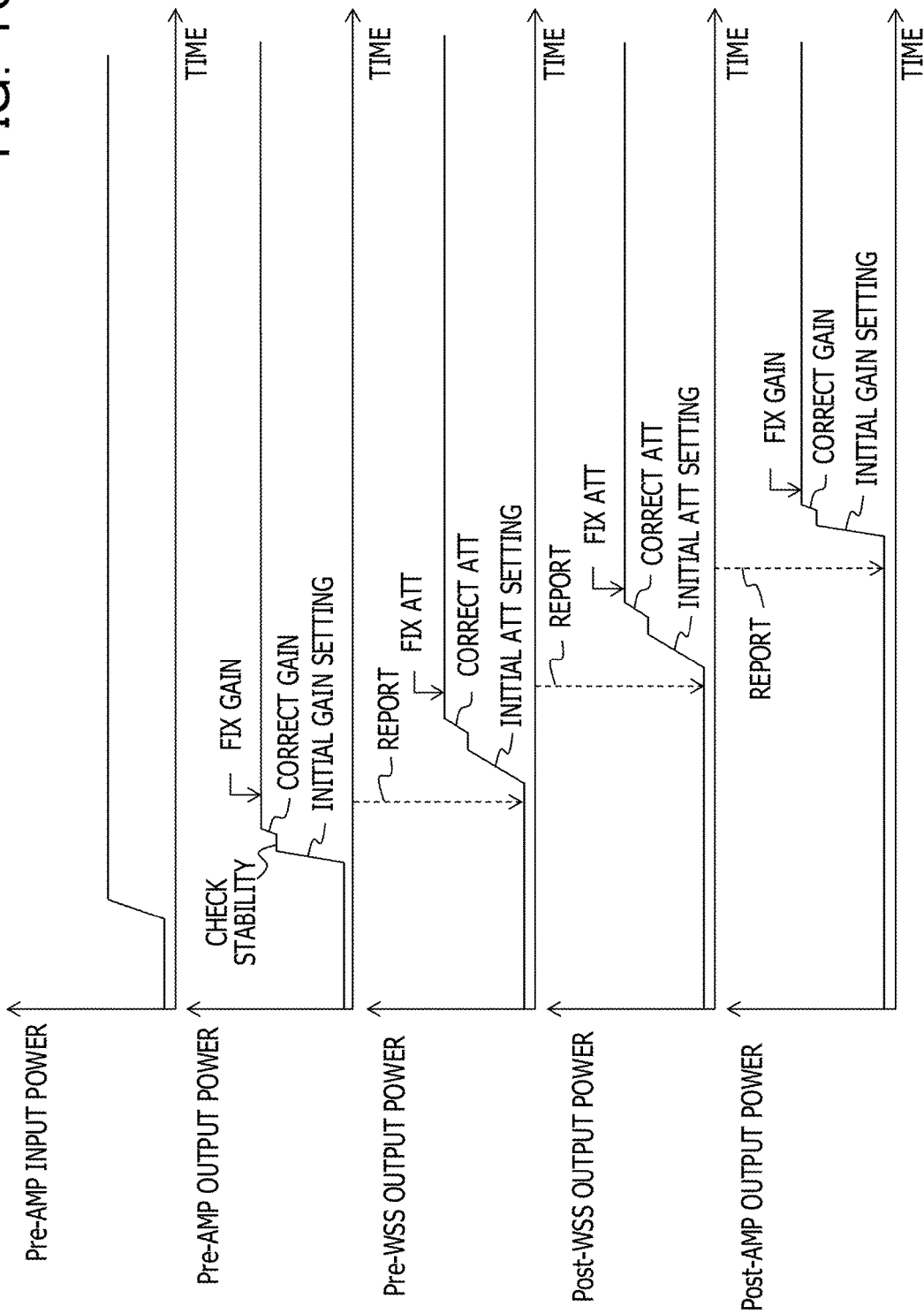
FIG. 15 is a timing chart that illustrates an example of controlling an optical power in the WDM transmission device.

FIG. 15 is a timing chart that illustrates an example of controlling an optical power in the WDM transmission device. In the WDM transmission device, the control of an optical power is performed sequentially from a circuit implemented closer to the input side. In other words, the attenuation amount in the pre-WSS 21 is controlled after the control of the gain of the pre-amplifier 12 has been completed. The attenuation amount in the post-WSS 23 is controlled after the control of the attenuation amount in the pre-WSS 21 has been completed. The gain of the post-amplifier 31 is controlled after the control of the attenuation amount in the post-WSS 23 has been completed. The "report" in FIG. 15 indicates that control completion information is given.

With respect to the control of gains of the pre-amplifier 12 and the post-amplifier 31, after an initial gain setting is performed in each of the pre-amplifier 12 and the post-amplifier 31, a feedback control is performed that matches an output optical power with a target level. Here, the target level is known, and the initial gain setting is performed such that an output optical power that is close to the target level can be obtained. In other words, the gain of each of the amplifiers is configured to be a value close to a target value before the feedback control described above is started. Thus, a period of time needed for each of the feedback controls is short and the setting time for each of the amplifiers is also short.

Likewise, with respect to the attenuation control in the pre-WSS 21 and the post-WSS 23, after an initial attenuation setting is performed in each of the pre-WSS 21 and the post-WSS 23, a feedback control is performed so as to match an output optical power of each wavelength channel with a target level. Here, the target level is known, and the initial attenuation setting is performed such that an output optical power that is close to the target level can be obtained. In other words, the attenuation amount in each of the WSSs is configured to be a value close to a target value before the feedback control described above is started. Thus, a period of time needed for each of the feedback controls is short and the setting time for each of the WSSs is also short.

With respect to the control of a gain of the pre-amplifier 12, after the stability of an input optical power is checked, the control of a gain of the pre-amplifier 12 then performed, and then the control of circuits (the pre-WSS 21, the post-WSS 23, and the post-amplifier 31) implemented on the output side of the pre-amplifier 12 is performed. Thus, amplifiers or WSSs are not controlled at the same time in a plurality of nodes in a WDM transmission system, which results in suppressing an excess variation in optical power.

Figure 16:
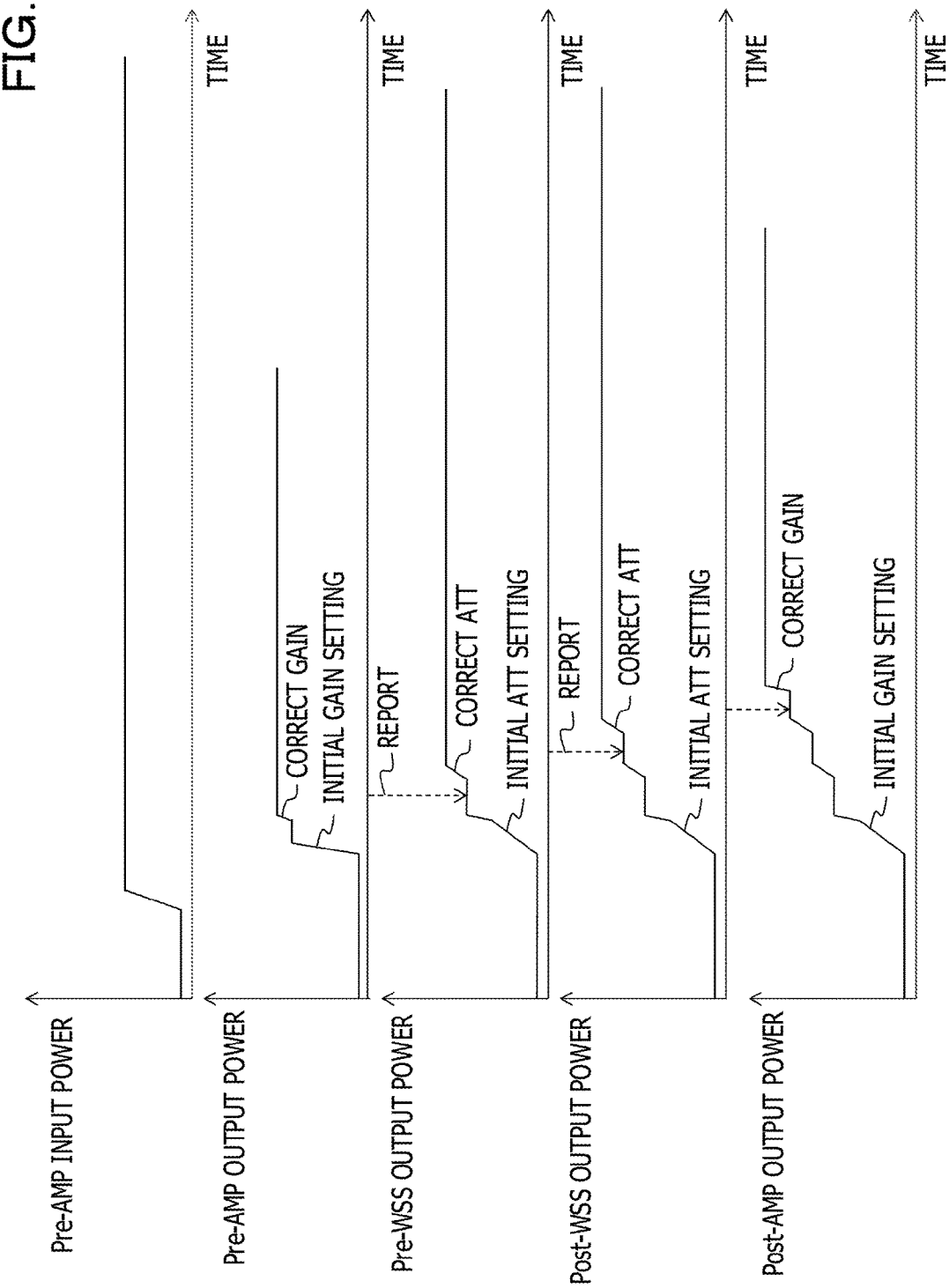
FIG. 16 is a timing chart that illustrates another example of controlling an optical power in the WDM transmission device.

FIG. 16 is a timing chart that illustrates another example of controlling an optical power in the WDM transmission device. In this example, the initial settings of the pre-amplifier 12, the pre-WSS 21, the post-WSS 23, and the post-amplifier 31 are performed in parallel. Here, the amplifier controller 16, the WSS controller 26, and the amplifier controller 34 perform an initial setting operation in cooperation with one another. After that, the gain control for the pre-amplifier 12, the attenuation amount control for the pre-WSS 21, the attenuation amount control for the post-WSS 23, and the gain control for the post-amplifier 31 are performed sequentially. Also in this procedure, control completion information is reported from the amplifier controller 16 to the WSS controller 26, and control completion information is reported from the WSS controller 26 to the amplifier controller 34. According to the procedure illustrated in FIG. 16, the setting time for the WDM transmission device can be reduced compared with the procedure illustrated in FIG. 15.

In the second embodiment, as illustrated in FIGS. 11 to 14, after the optical power in the WDM transmission device is controlled at a target level, the gain of each amplifier and the attenuation amount in each WSS are fixed. Thus, even when the number of wavelength channels is changed, the variation in an optical power of each wavelength channel is suppressed. Note that in an ALC mode in which an output optical power of each amplifier or each WSS is controlled at a constant level, an overshooting and/or an undershooting of an optical power may occur when the number of wavelength channels is changed.

Further, in the second embodiment, gains of the pre-amplifier 12 and the post-amplifier 31 have already been configured when a wavelength channel is added during the operation of the WDM transmission device. Thus, an initial gain setting (S2, S53) is not needed when a wavelength channel is added. However, an optical power is adjusted for the added wavelength channel in the WSS circuit 20.

Third Embodiment

In the example illustrated in FIG. 4 or 9, the gain of the post-amplifier 31 is controlled based on a total optical power of a WDM optical signal output from the post-amplifier 31. On the other hand, in a third embodiment, the gain of the post-amplifier 31 is controlled based on an optical power of each wavelength channel in the WDM optical signal output from the post-amplifier 31.

Figure 17:
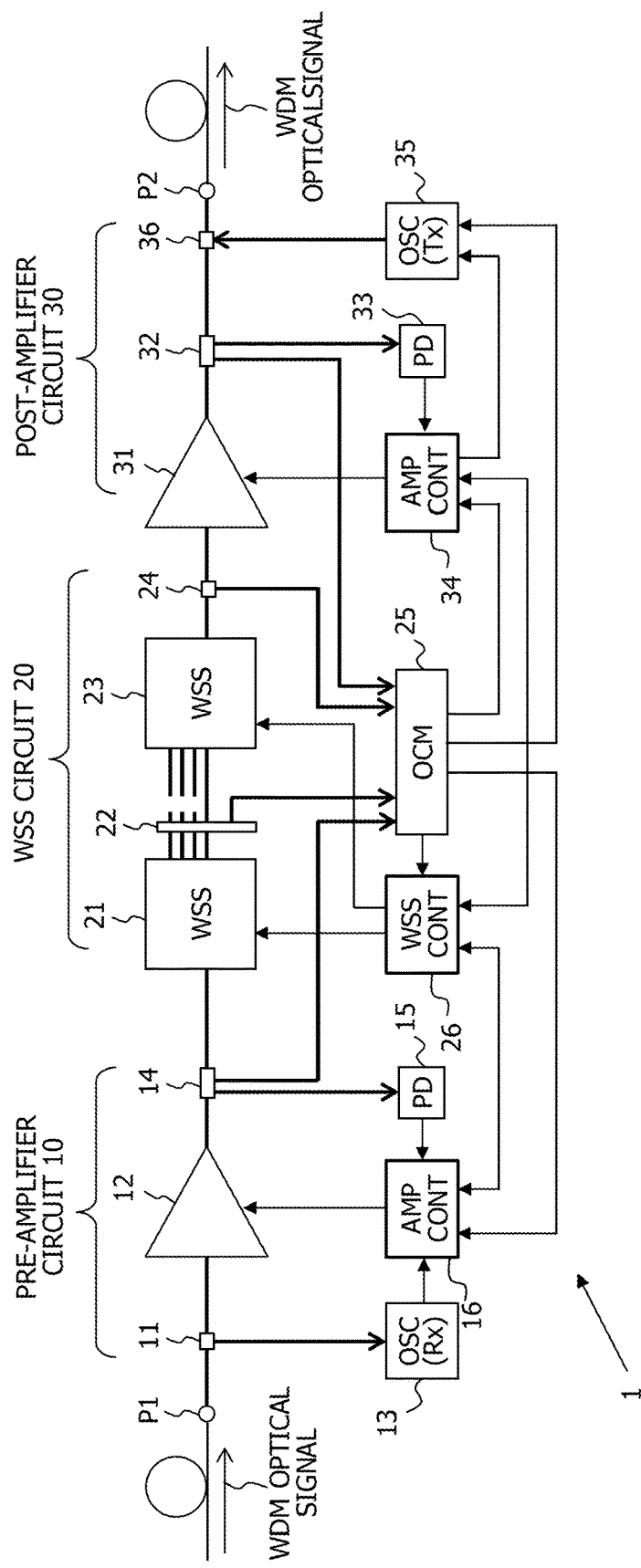
FIG. 17 illustrates an example of the WDM transmission device according to a third embodiment.

FIG. 17 illustrates an example of the WDM transmission device according to the third embodiment. As in the first or second embodiment, the WDM transmission device in the third embodiment includes the pre-amplifier circuit 10, the WSS circuit 20, and the post-amplifier circuit 30. However, in the third embodiment, a WDM optical signal output from the post-amplifier 31 is split by the optical splitter 32 and guided to the optical channel monitor 25. The amplifier controller 34 corrects a gain of the post-amplifier 31 using a result of monitoring performed by the optical channel monitor 25.

Figure 18:
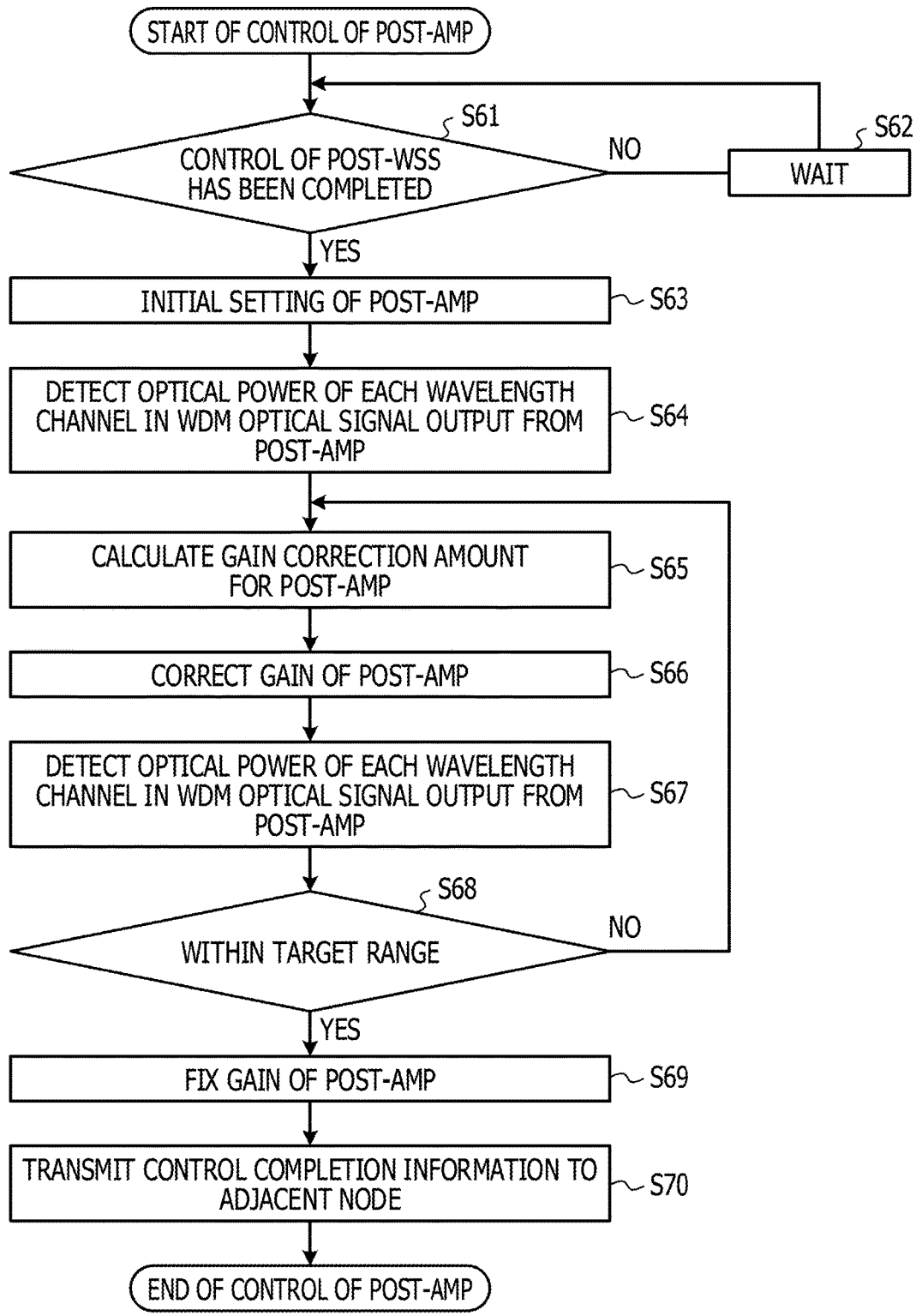
FIG. 18 is a flowchart that illustrates an example of the method for controlling a gain of the post-amplifier in the third embodiment.

FIG. 18 is a flowchart that illustrates an example of the method for controlling a gain of the post-amplifier in the third embodiment. Processing of this flowchart is performed after the gain control in the pre-amplifier circuit 10 and the attenuation control in the WSS circuit 20 have been completed.

S61 to S70 in the flowchart illustrated in FIG. 18 are almost the same as S51 to S60 in the flowchart illustrated in FIG. 14. However, in the third embodiment, in S64, the amplifier controller 34 detects an optical power of each wavelength channel in a WDM optical signal output from the post-amplifier 31. The optical power of each wavelength channel is measured by the optical channel monitor 25. Then, in S65, the amplifier controller 34 calculates a gain correction amount for correcting a gain of the post-amplifier 31 based on the optical power of each wavelength channel. In this example, the gain correction amount is calculated such that an average optical power of the wavelength channels approaches a target level. Further, in S67, the amplifier controller 34 detects an optical power of each wavelength channel in the WDM optical signal output from the post-amplifier 31. Then, in S68, the amplifier controller 34 calculates a difference between an average optical power of the respective wavelength channels and the target level.

Other Embodiment

Control completion information is not necessarily reported between controllers (the amplifier controller 16, the WSS controller 26, and the amplifier controller 34). For example, if the period of time for a control performed by each controller can be estimated, each of the controllers may decide when to start the control according to the period of time for a control performed by a corresponding circuit on its input side. Specifically, the WSS controller 26 starts the control of the pre-WSS 21 and the post-WSS 23 when a specified control period of time has elapsed since the amplifier controller 16 started the control of the pre-amplifier 12. The amplifier controller 34 starts the control of the post-amplifier 31 when a specified control period of time has elapsed since the WSS controller 26 started the control of the pre-WSS 21 and the post-WSS 23. Alternatively, each of the controllers may perform a feedback operation to correct a gain or an attenuation amount only one time. In this case, a period of time needed to adjust an optical power in the WDM transmission device is further reduced.

In the example described above, attenuation amounts of the pre-WSS 21 and the post-WSS 23 are corrected, but the present invention is not limited to this configuration. For example, the WSS controller 26 may only perform an initial setting in the pre-WSS 21. Alternatively, the WSS controller 26 may correct an attenuation amount of each wavelength channel in the pre-WSS 21 based on an optical power of each wavelength channel in a WDM optical signal output from the post-WSS 23.

The WSS circuit 20 does not necessarily include both the pre-WSS 21 and the post-WSS 23. For example, an optical splitter may be implemented instead of the pre-WSS 21.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device, comprising:
   a first optical amplifier configured to amplify a wavelength division multiplexed optical signal received via an optical fiber;
   a wavelength selective switch configured to control optical powers of respective wavelength channels multiplexed in the wavelength division multiplexed optical signal that is amplified by the first optical amplifier;
   a second optical amplifier configured to amplify the wavelength division multiplexed optical signal output from the wavelength selective switch;
   an optical channel monitor configured to detect optical powers of respective wavelength channels multiplexed in the wavelength division multiplexed optical signal; and
   a processor configured to:
      control a gain of the first optical amplifier based on initial setting information, calculate an average optical power of the plurality of wavelength channels multiplexed in the wavelength division multiplexed optical signal that is amplified by the first optical amplifier based on the optical powers detected by the optical channel monitor, and correct the gain of the first optical amplifier such that the average optical power of a plurality of wavelength channels multiplexed in the wavelength division multiplexed optical signal that is amplified by the first optical amplifier approaches a target level after a specified period of time has elapsed from when the gain of the first optical amplifier is controlled based on the initial setting information.

2. The optical transmission device according to claim 1, wherein the processor is configured to calculate the average optical power of wavelength channels whose optical powers are higher than a specified threshold level among the plurality of wavelength channels multiplexed in the wavelength division multiplexed optical signal that is amplified by the first optical amplifier.

3. The optical transmission device according to claim 1, wherein the initial setting information includes information that indicates an output optical power in a source node of the wavelength division multiplexed optical signal received by the optical transmission device, and information that indicates a loss in an optical fiber between the source node and the optical transmission device, and the processor is configured to control the gain of the first optical amplifier based on the initial setting information and the target level.

4. An optical transmission device, comprising:

a first optical amplifier configured to amplify a wavelength division multiplexed optical signal received via an optical fiber;

a wavelength selective switch configured to control optical powers of respective wavelength channels multiplexed in the wavelength division multiplexed optical signal that is amplified by the first optical amplifier;

a second optical amplifier configured to amplify the wavelength division multiplexed optical signal output from the wavelength selective switch;

an optical channel monitor configured to detect optical powers of respective wavelength channels multiplexed in the wavelength division multiplexed optical signal; and an processor configured to:

controls a gain of the first optical amplifier based on initial setting information, determine whether an input optical power of the first optical amplifier is stable, calculate an average optical power of the plurality of wavelength channels multiplexed in the wavelength division multiplexed optical signal that is amplified by the first optical amplifier based on the optical powers detected by the optical channel monitor, and correct the gain of the first optical amplifier such that the average optical power of a plurality of wavelength channels multiplexed in the wavelength division multiplexed optical signal that is amplified by the first optical amplifier approaches a target level when the input optical power of the first optical amplifier is stable.

5. The optical transmission device according to claim 4, wherein the processor is configured to:

measure the input optical power of the first optical amplifier, and when a variation in the measured input optical power is smaller than a specified threshold, determine that the input optical power of the first optical amplifier is stable.

6. The optical transmission device according to claim 4, wherein the processor is configured to when control completion information, indicating the completion status of controlling a power of the wavelength division multiplexed optical signal that received by the optical transmission device in a source node of the wavelength division multiplexed optical signal, is received, determine that the input optical power of the first optical amplifier is stable.

7. The optical transmission device according to claim 4, wherein the initial setting information includes information that indicates an output optical power in a source node of the wavelength division multiplexed optical signal received by the optical transmission device, and information that indicates a loss in an optical fiber between the source node and the optical transmission device, and the processor is configured to control the gain of the first optical amplifier based on the initial setting information and the target level.

8. A transmission method executed by an optical transmission device that includes a processor, a first optical amplifier, a second optical amplifier, and a wavelength selective switch, the transmission method comprising:

controlling, by the processor, a gain of the first optical amplifier based on initial setting information;

amplifying, by the first optical amplifier, a wavelength division multiplexed optical signal received via an optical fiber;

detecting, by an optical channel monitor, optical powers of respective wavelength channels multiplexed in the wavelength division multiplexed optical signal;

calculating, by the processor, an average optical power of the plurality of wavelength channels multiplexed in the wavelength division multiplexed optical signal that is amplified by the first optical amplifier based on the optical powers detected by the optical channel monitor;

correcting, by the processor, the gain of the first optical amplifier such that the average optical power of a plurality of wavelength channels multiplexed in the wavelength division multiplexed optical signal that is amplified by the first optical amplifier approaches a target level after a specified period of time has elapsed from when the gain of the first optical amplifier is controlled;

controlling, by the wavelength selective switch, optical powers of each of the plurality of wavelength channels based on the corrected gain of the first optical amplifier; and amplifying, by the second optical amplifier, the wavelength division multiplexed optical signal outputted from the wavelength selective switch.

* * * * *